(12) United States Patent
Steinberg et al.

(10) Patent No.: US 8,498,753 B2
(45) Date of Patent: Jul. 30, 2013

(54) SYSTEM, METHOD AND APPARATUS FOR JUST-IN-TIME CONDITIONING USING A THERMOSTAT

(75) Inventors: John Douglas Steinberg, Millbrae, CA (US); Scott Douglas Hublou, Redwood City, CA (US); Leo Cheung, Sunnyvale, CA (US)

(73) Assignee: EcoFactor, Inc., Millbrae, CA (US)

( * ) Notice: Subject to any disclaimer, the term of this patent is extended or adjusted under 35 U.S.C. 154(b) by 93 days.

(21) Appl. No.: 12/773,690

(22) Filed: May 4, 2010

(65) Prior Publication Data

US 2010/0318227 A1 Dec. 16, 2010

Related U.S. Application Data

(60) Provisional application No. 61/215,657, filed on May 8, 2009.

(51) Int. Cl.
*G05D 23/00* (2006.01)
(52) U.S. Cl.
USPC .......................................... 700/300; 700/278
(58) Field of Classification Search
USPC ..................... 700/296, 299, 300, 306, 278
See application file for complete search history.

(56) References Cited

U.S. PATENT DOCUMENTS

| | | | |
|---|---|---|---|
| 4,136,732 A | 1/1979 | Demaray et al. | |
| 4,341,345 A | 7/1982 | Hammer et al. | |
| 4,403,644 A | 9/1983 | Hebert | |
| 4,475,685 A * | 10/1984 | Grimado et al. | 236/46 R |
| 4,655,279 A | 4/1987 | Harmon | |
| 4,674,027 A | 6/1987 | Beckey | |
| 5,244,146 A | 9/1993 | Jefferson et al. | |
| 5,270,952 A | 12/1993 | Adams et al. | |
| 5,314,004 A | 5/1994 | Strand et al. | |
| 5,462,225 A | 10/1995 | Massara et al. | |
| 5,544,036 A | 8/1996 | Brown et al. | |
| 5,555,927 A | 9/1996 | Shah | |

(Continued)

FOREIGN PATENT DOCUMENTS

| | | |
|---|---|---|
| EP | 0415747 | 3/1991 |
| KR | 10-1994-0011902 | 6/1994 |
| KR | 10-2000-0059532 | 10/2000 |

OTHER PUBLICATIONS

Bourhan et al., "Dynamic model of an HVAC system for control analysis", Elsevier 2004.*
Honeywell, W7600/W7620 Controller Reference Manual, HW0021207, Oct. 1992.

(Continued)

*Primary Examiner* — Carlos Ortiz Rodriguez
(74) *Attorney, Agent, or Firm* — Knobbe, Martens, Olson & Bear, LLP

(57) ABSTRACT

Systems and methods for reducing the cycling time of a climate control system. For example, one or more of the exemplary systems can receive from a database a target time at which a structure is desired to reach a target temperature. In addition, the system acquires the temperature inside the structure and the temperature outside the structure at a time prior to the target time. The systems use a thermal characteristic of the structure and a performance characteristic of the climate control system, to determine the appropriate time prior to the target time at which the climate control system should turn on based at least in part on the structure, the climate control system, the inside temperature and the outside temperature. The systems then set a setpoint on a thermostatic controller to control the climate control system.

20 Claims, 18 Drawing Sheets

U.S. PATENT DOCUMENTS

| | | | |
|---|---|---|---|
| 5,572,438 A | 11/1996 | Ehlers et al. |
| 5,682,949 A | 11/1997 | Ratcliffe et al. |
| 5,717,609 A | 2/1998 | Packa et al. |
| 5,818,347 A | 10/1998 | Dolan et al. |
| 5,977,964 A | 11/1999 | Williams et al. |
| 6,115,713 A | 9/2000 | Pascucci et al. |
| 6,145,751 A | 11/2000 | Ahmed |
| 6,178,362 B1 | 1/2001 | Woolard et al. |
| 6,260,765 B1 | 7/2001 | Natale et al. |
| 6,351,693 B1 | 2/2002 | Monie |
| 6,400,996 B1 | 6/2002 | Hoffberg et al. |
| 6,437,692 B1 | 8/2002 | Petite et al. |
| 6,478,233 B1 | 11/2002 | Shah |
| 6,480,803 B1 | 11/2002 | Pierret et al. |
| 6,483,906 B1 | 11/2002 | Lggulden et al. |
| 6,536,675 B1 | 3/2003 | Pesko et al. |
| 6,542,076 B1 | 4/2003 | Joao |
| 6,549,130 B1 | 4/2003 | Joao |
| 6,574,537 B2 | 6/2003 | Kipersztok et al. |
| 6,580,950 B1 | 6/2003 | Johnson |
| 6,594,825 B1 | 7/2003 | Goldschmidtlki et al. |
| 6,595,430 B1 | 7/2003 | Shah |
| 6,598,056 B1 | 7/2003 | Hull et al. |
| 6,619,555 B2 | 9/2003 | Rosen |
| 6,622,097 B2 | 9/2003 | Hunter |
| 6,622,115 B1 | 9/2003 | Brown et al. |
| 6,622,925 B2 | 9/2003 | Carner et al. |
| 6,622,926 B1 | 9/2003 | Sartain et al. |
| 6,628,997 B1 | 9/2003 | Fox et al. |
| 6,633,823 B2 | 10/2003 | Bartone et al. |
| 6,643,567 B2 | 11/2003 | Kolk et al. |
| 6,671,586 B2 | 12/2003 | Davis et al. |
| 6,695,218 B2 | 2/2004 | Fleckenstein |
| 6,726,113 B2 | 4/2004 | Guo |
| 6,731,992 B1 | 5/2004 | Ziegler |
| 6,734,806 B1 | 5/2004 | Cratsley |
| 6,772,052 B1 | 8/2004 | Amundsen |
| 6,785,592 B1 | 8/2004 | Smith |
| 6,785,630 B2 | 8/2004 | Kolk |
| 6,789,739 B2 | 9/2004 | Rosen |
| 6,853,959 B2 | 2/2005 | Ikeda et al. |
| 6,868,293 B1 | 3/2005 | Schurr |
| 6,868,319 B2 | 3/2005 | Kipersztok et al. |
| 6,882,712 B1 | 4/2005 | Iggulden et al. |
| 6,889,908 B2 | 5/2005 | Crippen et al. |
| 6,891,838 B1 | 5/2005 | Petite et al. |
| 6,912,429 B1 | 6/2005 | Bilger |
| 6,991,029 B2 | 1/2006 | Orfield et al. |
| 7,009,493 B2 | 3/2006 | Howard |
| 7,031,880 B1 | 4/2006 | Seem et al. |
| 7,039,532 B2 | 5/2006 | Hunter |
| 7,061,393 B2 | 6/2006 | Buckingham et al. |
| 7,089,088 B2 | 8/2006 | Terry et al. |
| 7,130,719 B2 | 10/2006 | Ehlers et al. |
| 7,130,832 B2 | 10/2006 | Bannai et al. |
| H2176 H | 12/2006 | Meyer et al. |
| 7,167,079 B2 | 1/2007 | Smyth et al. |
| 7,187,986 B2 | 3/2007 | Johnson et al. |
| 7,205,892 B2 | 4/2007 | Luebke et al. |
| 7,215,746 B2 | 5/2007 | Iggulden et al. |
| 7,216,015 B2 | 5/2007 | Poth |
| 7,231,424 B2 | 6/2007 | Bodin et al. |
| 7,232,075 B2 | 6/2007 | Rosen |
| 7,242,988 B1 | 7/2007 | Hoffberg et al. |
| 7,260,823 B2 | 8/2007 | Schlack et al. |
| 7,356,384 B2 | 4/2008 | Gull et al. |
| 7,483,964 B1 | 1/2009 | Jackson et al. |
| 7,644,869 B2 | 1/2010 | Hoglund et al. |
| 7,784,704 B2 | 8/2010 | Harter |
| 7,848,900 B2 | 12/2010 | Steinberg et al. |
| 7,894,943 B2 | 2/2011 | Sloup et al. |
| 7,908,116 B2 | 3/2011 | Steinberg et al. |
| 7,908,117 B2 | 3/2011 | Steinberg et al. |
| 8,010,237 B2 | 8/2011 | Cheung et al. |
| 8,019,567 B2 | 9/2011 | Steinberg et al. |
| 8,090,477 B1 | 1/2012 | Steinberg |
| 8,131,497 B2 | 3/2012 | Steinberg et al. |
| 8,131,506 B2 | 3/2012 | Steinberg et al. |
| 8,180,492 B2 | 5/2012 | Steinberg |
| 8,340,826 B2 | 12/2012 | Steinberg |
| 2003/0040934 A1 | 2/2003 | Skidmore et al. |
| 2004/0176880 A1 | 9/2004 | Obradovich et al. |
| 2005/0222889 A1 | 10/2005 | Lai et al. |
| 2005/0288822 A1 | 12/2005 | Rayburn |
| 2006/0045105 A1 | 3/2006 | Dobosz et al. |
| 2006/0214014 A1 | 9/2006 | Bash et al. |
| 2007/0043477 A1 | 2/2007 | Ehlers et al. |
| 2007/0045431 A1 | 3/2007 | Chapman et al. |
| 2007/0146126 A1 | 6/2007 | Wang |
| 2008/0083234 A1 | 4/2008 | Krebs et al. |
| 2008/0198549 A1 | 8/2008 | Rasmussen et al. |
| 2008/0281472 A1 | 11/2008 | Podgorny et al. |
| 2009/0052859 A1 | 2/2009 | Greenberger et al. |
| 2009/0099699 A1 | 4/2009 | Steinberg et al. |
| 2009/0125151 A1 | 5/2009 | Steinberg et al. |
| 2009/0240381 A1 | 9/2009 | Lane |
| 2009/0281667 A1 | 11/2009 | Masui et al. |
| 2010/0019052 A1 | 1/2010 | Yip |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0156608 A1 | 6/2010 | Bae et al. |
| 2010/0162285 A1 | 6/2010 | Cohen et al. |
| 2010/0211224 A1 | 8/2010 | Keeling et al. |
| 2010/0235004 A1 | 9/2010 | Thind |
| 2010/0282857 A1 | 11/2010 | Steinberg |
| 2010/0289643 A1 | 11/2010 | Trundle et al. |
| 2010/0308119 A1 | 12/2010 | Steinberg et al. |
| 2010/0318227 A1 | 12/2010 | Steinberg et al. |
| 2011/0031323 A1 | 2/2011 | Nold et al. |
| 2011/0290893 A1 | 12/2011 | Steinberg |
| 2011/0307103 A1 | 12/2011 | Cheung et al. |
| 2012/0065935 A1 | 3/2012 | Steinberg et al. |
| 2012/0086562 A1 | 4/2012 | Steinberg |
| 2012/0158350 A1 | 6/2012 | Steinberg et al. |
| 2012/0221151 A1 | 8/2012 | Steinberg |
| 2012/0221294 A1 | 8/2012 | Steinberg et al. |

OTHER PUBLICATIONS

Arnes, et al., "How Ambient Intelligence Will Improve Habitability and Energy Efficiency in Buildings", 2005, research paper, Center for the Built Environment, Controls and Information Technology.

Johnson Controls, Touch4 building automation system brochure, 2007.

Kilicotte, et al., "Dynamic Controls for Energy Efficiency and Demand Response: Framework Concepts and a New Construction Study Case in New York", Proceedings of the 2006 ACEEE Summer Study of Energy Efficiency in Buildings, Pacific Grove. CA, Aug. 13-18, 2006.

Lin, et al., "Multi-Sensor Single-Actuator Control of HVAC Systems", 2002.

Wang, et al., "Opportunities to Save Energy and Improve Comfort by Using Wireless Sensor Networks in Buildings," (2003), Center for Environmental Design Research.

Wetter, et al., "A comparison of deterministic and probabilistic optimization algorithms for nonsmooth simulation-based optimization", Building and Environment 39, 2004, pp. 989-999.

Emerson Climate Technologies, "Network Thermostat for E2 Building Controller Installation and Operation Manual", 2007.

Johnson Controls, "T600HCx-3 Single-Stage Thermostats", 2006.

Written Opinion and Search Report for PCT/US2011/032537, dated Dec. 12, 2011.

Comverge SuperStat Flyer, prior to Jun. 28, 2007.

Control4 Wireless Thermostat Brochure, 2006.

Cooper Power Systems Web Page, 2000-2009.

Enernoc Web Page 2004-2009.

Enerwise Website, 1999-2009.

Honeywell Programmable Thermostat Owner's Guide, www.honeywell.com/yourhome, 2004.

Pier, Southern California Edison, Demand Responsive Control of Air Conditioning via Programmable Communicating Thermostats Draft Report; Feb. 14, 2006.

Proliphix Thermostat Brochure, prior to Jun. 2007.

Raji, "Smart Networks for Control", IEEE Spectrum, Jun. 1994.

* cited by examiner

FIG. 10

| Time | Temperature | | Outside Conditions | | | | | Inside Conditions | | | | | | | |
|---|---|---|---|---|---|---|---|---|---|---|---|---|---|---|---|
| | Inside Temp. | Outside Temp. | Conditions | Humidity | Pressure | Wind Speed | Wind Direction | Cool Setting | Heat Setting | Hold Mode | Schd Setting | Schd Cool | Schd Heat | Hvac State | Hvac Mode |
| (hh24:mm) | 1302 | 1304 | 1306 | 1308 | 1310 | 1312 | 1314 | | | | | | | | |
| 2009/04/10 11:00 | 69.70 | 54.00 | Mostly Cloudy | 74% | 29.89in/ 1012.1hPa Steady | 1.0mph 1.6kph | SE | 80.00 | 71.00 | Off | Out/Day | 80.00 | 65.00 | Heat | Heat |
| 2009/04/10 11:01 | 69.69 | 54.10 | Overcast | 74% | 29.89in/ 1012.1hPa Rising | 2.0mph 3.2kph | SE | 80.00 | 71.00 | Off | Out/Day | 80.00 | 65.00 | Heat | Heat |
| 2009/04/10 11:02 | 69.60 | 54.10 | Overcast | 74% | 29.89in/ 1012.1hPa Steady | 2.0mph 3.2kph | SE | 80.00 | 71.00 | Off | Out/Day | 80.00 | 65.00 | Heat | Heat |
| 2009/04/10 11:03 | 69.70 | 54.10 | Overcast | 74% | 29.89in/ 1012.1hPa Rising | 2.0mph 3.2kph | SE | 80.00 | 71.00 | Off | Out/Day | 80.00 | 65.00 | Heat | Heat |
| 2009/04/10 11:04 | 69.70 | 54.10 | Overcast | 74% | 29.89in/ 1012.1hPa Steady | 2.0mph 3.2kph | SE | 80.00 | 71.00 | Off | Out/Day | 80.00 | 65.00 | Heat | Heat |
| 2009/04/10 11:05 | 69.70 | 54.10 | Overcast | 74% | 29.89in/ 1012.1hPa Rising | 2.0mph 3.2kph | SE | 80.00 | 71.00 | Off | Out/Day | 80.00 | 65.00 | Heat | Heat |
| 2009/04/10 11:06 | 69.80 | 54.70 | Overcast | 72% | 29.89in/ 1012.1hPa Steady | 2.0mph 3.2kph | SE | 80.00 | 71.00 | Off | Out/Day | 80.00 | 65.00 | Heat | Heat |
| 2009/04/10 11:07 | 69.80 | 54.70 | Overcast | 72% | 29.89in/ 1012.1hPa Rising | 2.0mph 3.2kph | SE | 80.00 | 71.00 | Off | Out/Day | 80.00 | 65.00 | Heat | Heat |
| 2009/04/10 11:08 | 70.00 | 54.70 | Overcast | 72% | 29.89in/ 1012.1hPa Steady | 2.0mph 3.2kph | SE | 80.00 | 71.00 | Off | Out/Day | 80.00 | 65.00 | Heat | Heat |
| 2009/04/10 11:09 | 70.00 | 54.70 | Overcast | 72% | 29.89in/ 1012.1hPa Rising | 2.0mph 3.2kph | SE | 80.00 | 71.00 | Off | Out/Day | 80.00 | 65.00 | Heat | Heat |
| 2009/04/10 11:10 | 70.00 | 54.70 | Overcast | 72% | 29.89in/ 1012.1hPa Steady | 2.0mph 3.2kph | SE | 80.00 | 71.00 | Off | Out/Day | 80.00 | 65.00 | Heat | Heat |

| Outside/Inside Difference, Degrees F | Predicted Inside Temp Change, Degrees F/hour | | Outside/Inside Difference, Degrees F | Predicted Inside Temp Change, Degrees F/hour | | Outside/Inside Difference, Degrees F | Predicted Inside Temp Change, Degrees F/hour |
|---|---|---|---|---|---|---|---|
| -99 | -1.20945425 | | -49 | 0.61355475 | | 51 | 4.25957277 |
| -98 | -1.17299407 | | -48 | 0.65001493 | | 52 | 4.29603295 |
| -97 | -1.13653389 | | -47 | 0.68647511 | | 53 | 4.33249313 |
| -96 | -1.10007371 | | -46 | 0.72293529 | | 54 | 4.36895331 |
| -95 | -1.06361353 | | -45 | 0.75939547 | | 55 | 4.40541349 |
| -94 | -1.02715335 | | -44 | 0.79585565 | | 56 | 4.44187367 |
| -93 | -0.99069317 | | -43 | 0.83231583 | | 57 | 4.47833385 |
| -92 | -0.95423299 | | -42 | 0.86877602 | | 58 | 4.51479403 |
| -91 | -0.91777281 | | -41 | 0.9052362 | | 59 | 4.55125421 |
| -90 | -0.88131263 | | -40 | 0.94169638 | | 60 | 4.58771439 |
| -89 | -0.84485245 | | -39 | 0.97815656 | | 61 | 4.62417457 |
| -88 | -0.80839227 | | -38 | 1.01461674 | | 62 | 4.66063475 |
| -87 | -0.77193209 | | -37 | 1.05107692 | | 63 | 4.69709493 |
| -86 | -0.73547191 | | -36 | 1.0542371 | | 64 | 4.73355511 |
| -85 | -0.69901173 | | -35 | 1.12399728 | | 65 | 4.77001529 |
| -84 | -0.66255155 | | -34 | 1.16045746 | | 66 | 4.80647547 |
| -83 | -0.62609137 | | -33 | 1.19691764 | | 67 | 4.84293565 |
| -82 | -0.58963119 | | -32 | 1.23337782 | | 68 | 4.87939583 |
| -81 | -0.55317101 | | -31 | 1.269838 | | 69 | 4.91585601 |
| -80 | -0.51671083 | | -30 | 1.30629818 | | 70 | 4.95231619 |
| -79 | -0.48025065 | | -29 | 1.34275836 | | 71 | 4.98877637 |
| -78 | -0.44379047 | | -28 | 1.37921854 | | 72 | 5.02523655 |

| | | | | | | |
|---|---|---|---|---|---|---|
| -77 | -0.40733029 | -27 | 1.41567872 | 23 | 3.23868772 | 73 | 5.06169673 |
| -76 | -0.37087011 | -26 | 1.4521389 | 24 | 3.27514791 | 74 | 5.09815691 |
| -75 | -0.33440993 | -25 | 1.48859908 | 25 | 3.31160809 | 75 | 5.13461709 |
| -74 | -0.29794975 | -24 | 1.52505926 | 26 | 3.34806827 | 76 | 5.17107727 |
| -73 | -0.26148957 | -23 | 1.56151944 | 27 | 3.38452845 | 77 | 5.20753745 |
| -72 | -0.22502939 | -22 | 1.59797962 | 28 | 3.42098663 | 78 | 5.24399763 |
| -71 | -0.18856921 | -21 | 1.6344398 | 29 | 3.45744881 | 79 | 5.28045781 |
| -70 | -0.15210903 | -20 | 1.67089998 | 30 | 3.49390899 | 80 | 5.31691799 |
| -69 | -0.11564885 | -19 | 1.70736016 | 31 | 3.53036917 | 81 | 5.35337817 |
| -68 | -0.07918867 | -18 | 1.74382034 | 32 | 3.56682935 | 82 | 5.38983835 |
| -67 | -0.04272849 | -17 | 1.78028052 | 33 | 3.60328953 | 83 | 5.42629853 |
| -66 | -0.00626831 | -16 | 1.8167407 | 34 | 3.63974971 | 84 | 5.46275871 |
| -65 | 0.03019187 | -15 | 1.85320088 | 35 | 3.67620989 | 85 | 5.49921889 |
| -64 | 0.06665205 | -14 | 1.88966106 | 36 | 3.74913025 | 86 | 5.53567907 |
| -63 | 0.10311223 | -13 | 1.92612124 | 37 | 3.74913025 | 87 | 5.57213925 |
| -62 | 0.13957241 | -12 | 1.96258142 | 38 | 3.78559043 | 88 | 5.60859943 |
| -61 | 0.17603259 | -11 | 1.9990416 | 39 | 3.82205061 | 89 | 5.64505962 |
| -60 | 0.21249277 | -10 | 2.03550178 | 40 | 3.85851079 | 90 | 5.6815198 |
| -59 | 0.24895295 | -9 | 2.07196196 | 41 | 3.89497097 | 91 | 5.71797998 |
| -58 | 0.28541313 | -8 | 2.10842214 | 42 | 3.93143115 | 92 | 5.75444016 |
| -57 | 0.32187331 | -7 | 2.14488232 | 43 | 3.96789133 | 93 | 5.79090034 |
| -56 | 0.35833349 | -6 | 2.1813425 | 44 | 4.00435151 | 94 | 5.82736052 |
| -55 | 0.39479367 | -5 | 2.21780268 | 45 | 4.04081169 | 95 | 5.86382070 |
| -54 | 0.43125385 | -4 | 2.25426286 | 46 | 4.07727187 | 96 | 5.90028088 |
| -53 | 0.46771403 | -3 | 2.29072304 | 47 | 4.11373205 | 97 | 5.93674106 |
| -52 | 0.50417421 | -2 | 2.32718322 | 48 | 4.15019223 | 98 | 5.97320124 |
| -51 | 0.54063439 | -1 | 2.3636434 | 49 | 4.18665241 | 99 | 6.00966142 |
| -50 | 0.57709457 | 0 | 2.40010358 | 50 | 4.22311259 | | |

FIG. 13-2

SYSTEM, METHOD AND APPARATUS FOR JUST-IN-TIME CONDITIONING USING A THERMOSTAT

CROSS-REFERENCE TO RELATED APPLICATIONS

This application claims priority to Provisional Application No. 61/215,657, filed May 8, 2009, the entirety of which is incorporated herein by reference and is to be considered part of this specification.

BACKGROUND OF THE INVENTION

Field of the Invention

Programmable thermostats have been available for more than 20 years. Programmable thermostats offer two types of advantages as compared to non-programmable devices. On the one hand, programmable thermostats can save energy in large part because they automate the process of reducing conditioning during times when the space is unoccupied, or while occupants are sleeping, and thus reduce energy consumption.

On the other hand, programmable thermostats can also enhance comfort as compared to manually changing setpoints using a non-programmable thermostat. For example, during the winter, a homeowner might manually turn down the thermostat from 70 degrees F. to 64 degrees when going to sleep and back to 70 degrees in the morning. The drawback to this approach is that there can be considerable delay between the adjustment of the thermostat and the achieving of the desired change in ambient temperature, and many people find getting out of bed, showering, etc. in a cold house unpleasant. A programmable thermostat allows homeowners to anticipate the desired result by programming a pre-conditioning of the home. So, for example, if the homeowner gets out of bed at 7 AM, setting the thermostat to change from the overnight setpoint of 64 degrees to 70 at 6 AM can make the house comfortable when the consumer gets up. The drawback to this approach is that the higher temperature will cost more to maintain, so the increase in comfort is purchased at the cost of higher energy usage.

A significant difficulty with this approach is that the amount of preconditioning required to meet a given standard of comfort is a function of several variables. First, the amount of preconditioning required will vary with outside temperature. An HVAC system that might require an hour to increase the temperature in a given home from 64 to 70 degrees when it is 45 degrees outside might take two hours when it is 5 degrees outside. Second, the amount of preconditioning required will vary depending on the relationship between the capacity of the HVAC system and the thermal characteristics of the structure. That is, a high capacity HVAC system in a given structure will achieve a target temperature faster than a smaller system; a well-insulated home with double-glazed windows will respond more quickly to a given HVAC system than an uninsulated home with single-glazed windows will. Consumers can program their thermostats to turn on the furnace early enough that the desired temperature is always reached at the target time even on the coldest days, but the cost of this choice will be wasted energy and money on warmer days. Alternatively, consumers can choose more economical settings, with the cost of loss of comfort on cold days. Similar tradeoffs will be faced when trying to optimize setbacks during the summer in homes that have air conditioning.

It would therefore be advantageous to have a means for controlling the HVAC system that is capable of taking into account both outside weather conditions and the thermal characteristics of individual homes in order to improve the ability to dynamically achieve the best possible balance between comfort and energy savings.

BRIEF DESCRIPTION OF THE DRAWINGS

FIG. 10 shows a table of some of the data used by the subject invention to predict temperatures.

FIG. 13 shows a table of predicted rates of change in temperature inside a given home for a range of temperature differentials between inside and outside.

DETAILED DESCRIPTION OF THE PREFERRED EMBODIMENT

Figure 1:
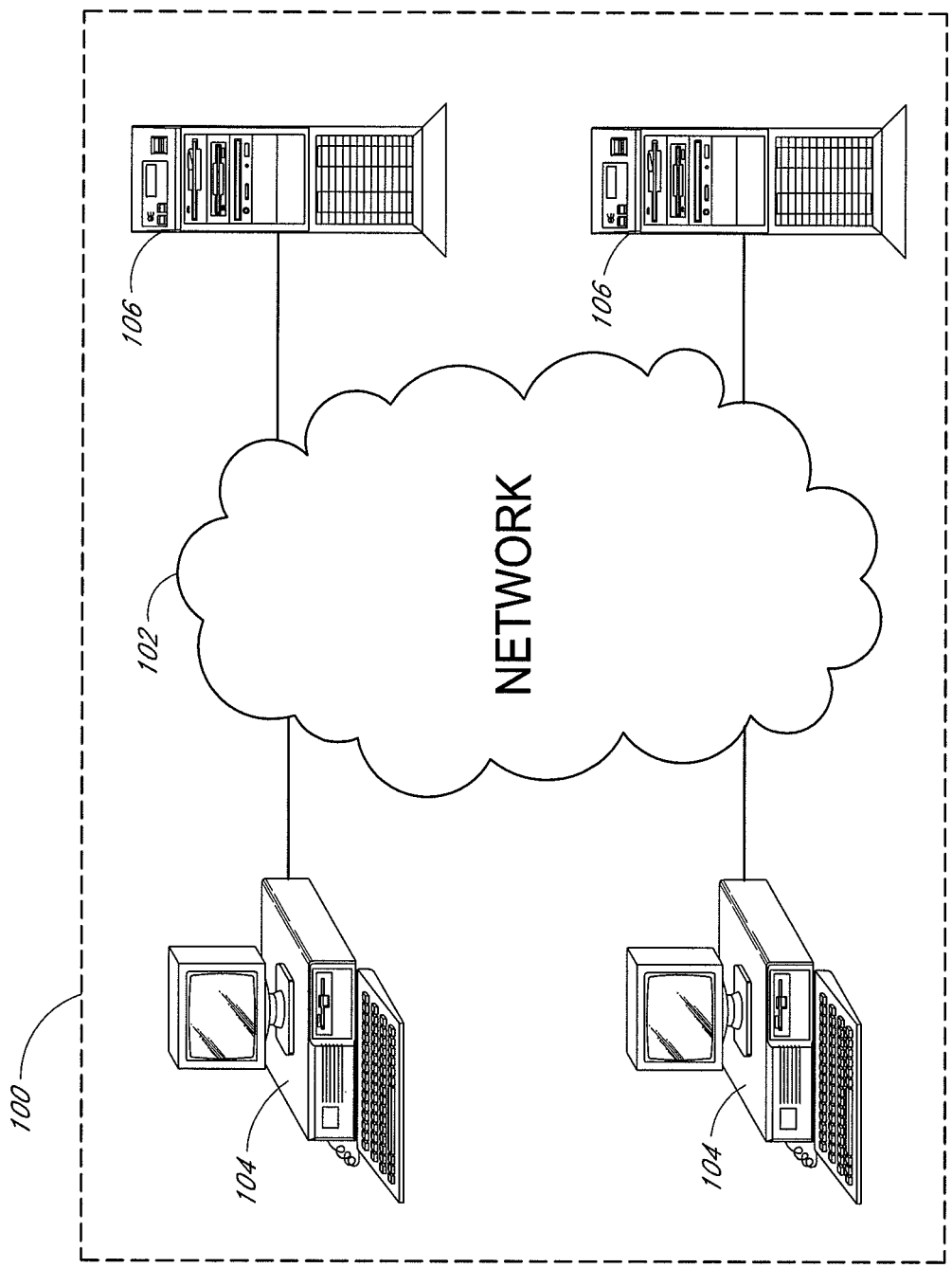
FIG. 1 shows an example of an overall environment in which an embodiment of the invention may be used.

FIG. 1 shows an example of an overall environment 100 in which an embodiment of the invention may be used. The environment 100 includes an interactive communication network 102 with computers 104 connected thereto. Also connected to network 102 are one or more server computers 106, which store information and make the information available to computers 104. The network 102 allows communication between and among the computers 104 and 106.

Presently preferred network 102 comprises a collection of interconnected public and/or private networks that are linked to together by a set of standard protocols to form a distributed network. While network 102 is intended to refer to what is now commonly referred to as the Internet, it is also intended to encompass variations which may be made in the future, including changes additions to existing standard protocols.

One popular part of the Internet is the World Wide Web. The World Wide Web contains a large number of computers 104 and servers 106, which store HyperText Markup Language (HTML) documents capable of displaying graphical and textual information. HTML is a standard coding convention and set of codes for attaching presentation and linking attributes to informational content within documents.

The servers 106 that provide offerings on the World Wide Web are typically called websites. A website is often defined by an Internet address that has an associated electronic page. Generally, an electronic page is a document that organizes the presentation of text graphical images, audio and video.

In addition to the Internet, the network 102 can comprise a wide variety of interactive communication media. For example, network 102 can include local area networks, interactive television networks, telephone networks, wireless data systems, two-way cable systems, and the like.

Network 102 can also comprise servers 106 that provide services other than HTML documents. Such services may include the exchange of data with a wide variety of "edge" devices, some of which may not be capable of displaying web pages, but that can record, transmit and receive information.

In one embodiment, computers 104 and servers 106 are conventional computers that are equipped with communications hardware such as a modem or a network interface card. The computers include processors such as those sold by Intel and AMD. Other processors may also be used, including general-purpose processors, multi-chip processors, embedded processors and the like.

Computers 104 can also be handheld and wireless devices such as personal digital assistants (PDAs), cellular telephones and other devices capable of accessing the network.

Computers 104 utilize a browser configured to interact with the World Wide Web. Such browsers may include Microsoft Explorer, Mozilla, Firefox, Opera or Safari. They may also include browsers used on handheld and wireless devices.

The storage medium may comprise any method of storing information. It may comprise random access memory (RAM), electronically erasable programmable read only memory (EEPROM), read only memory (ROM), hard disk, floppy disk, CD-ROM, optical memory, or other method of storing data.

Computers 104 and 106 may use an operating system such as Microsoft Windows, Apple Mac OS, Linux, Unix or the like.

Computers 106 may include a range of devices that provide information, sound, graphics and text, and may use a variety of operating systems and software optimized for distribution of content via networks.

Figure 2:
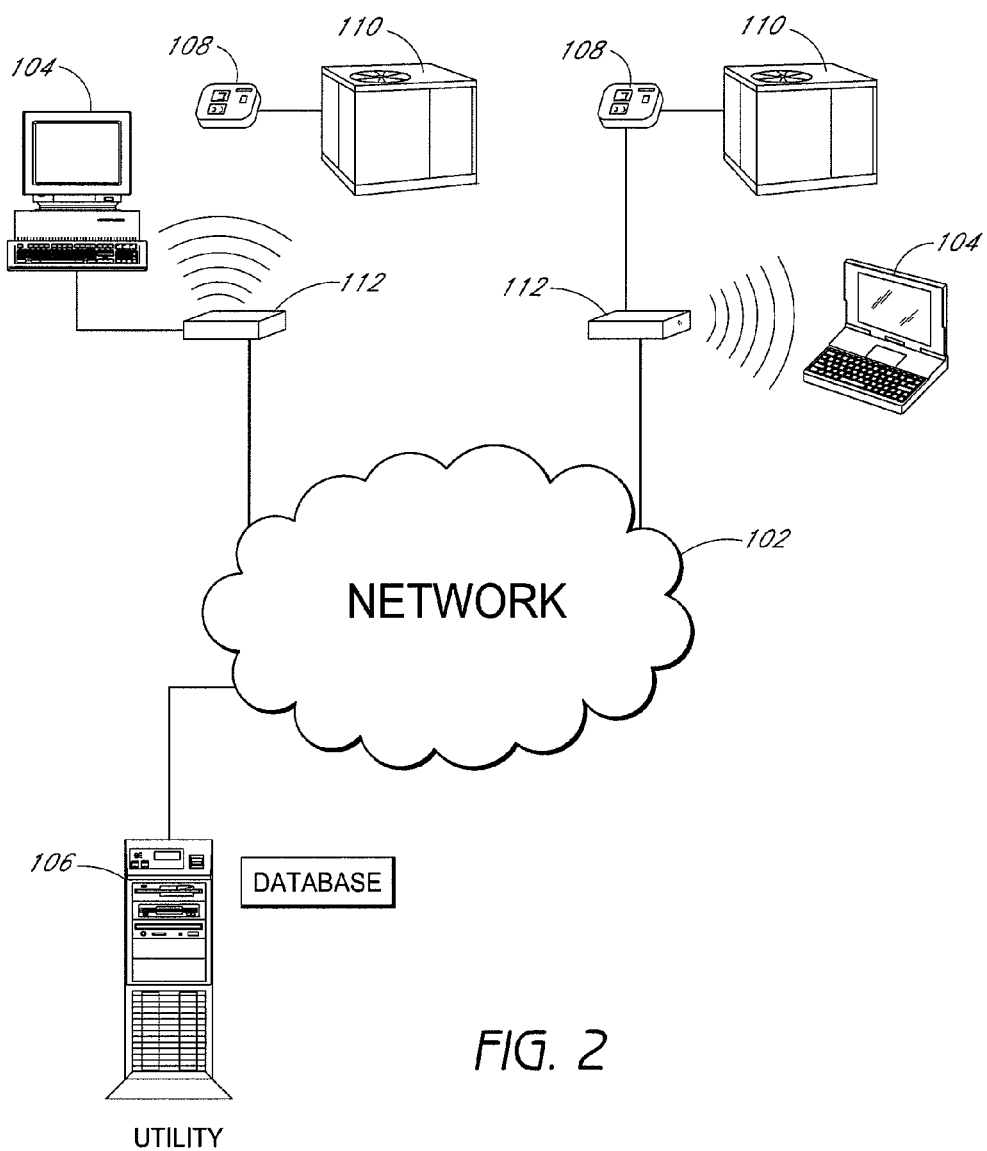
FIG. 2 shows a high-level illustration of the architecture of a network showing the relationship between the major elements of one embodiment of the subject invention.

FIG. 2 illustrates in further detail the architecture of the specific components connected to network 102 showing the relationship between the major elements of one embodiment of the subject invention. Attached to the network are thermostats 108 and computers 104 of various users. Connected to thermostats 108 are HVAC units 110. The HVAC units may be conventional air conditioners, heat pumps, or other devices for transferring heat into or out of a building. Each user is connected to the servers 106 via wired or wireless connection such as Ethernet or a wireless protocol such as IEEE 802.11, a gateway or wireless access point 112 that connects the computer and thermostat to the Internet via a broadband connection such as a digital subscriber line (DSL) or other form of broadband connection to the World Wide Web. In one embodiment, thermostat management server 106 is in communication with the network 102. Server 106 contains the content to be served as web pages and viewed by computers 104, as well as databases containing information used by the servers, and applications used to remotely manage thermostats 108.

Figure 3:
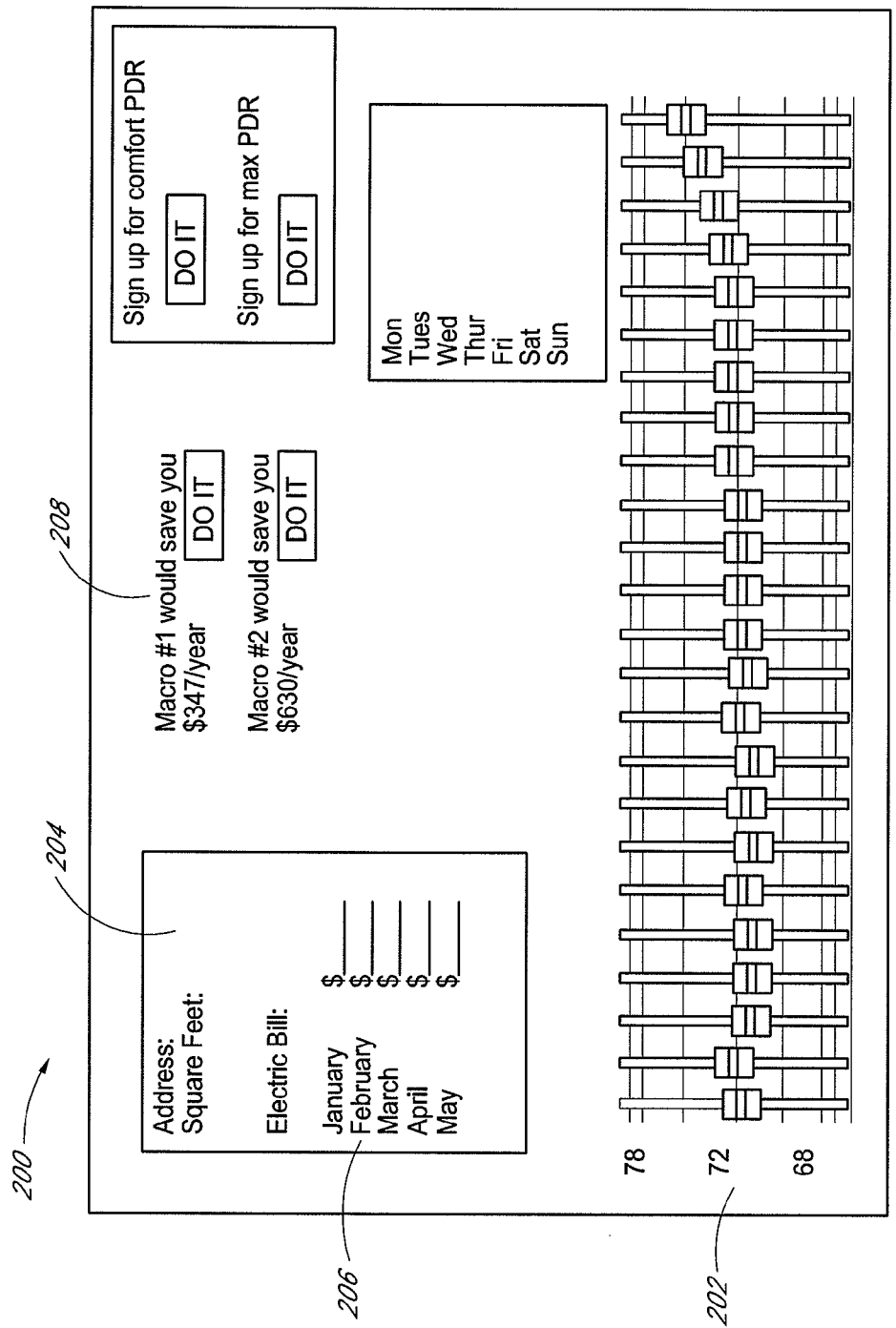
FIG. 3 shows an embodiment of the website to be used as part of the subject invention.

In the currently preferred embodiment, the website 200 includes a number of components accessible to the user, as shown in FIG. 3. Those components may include a means to store temperature settings 202, a means to enter information about the user's home 204, a means to enter the user's electricity bills 206, and means to elect to enable the subject invention 208.

Figure 4:
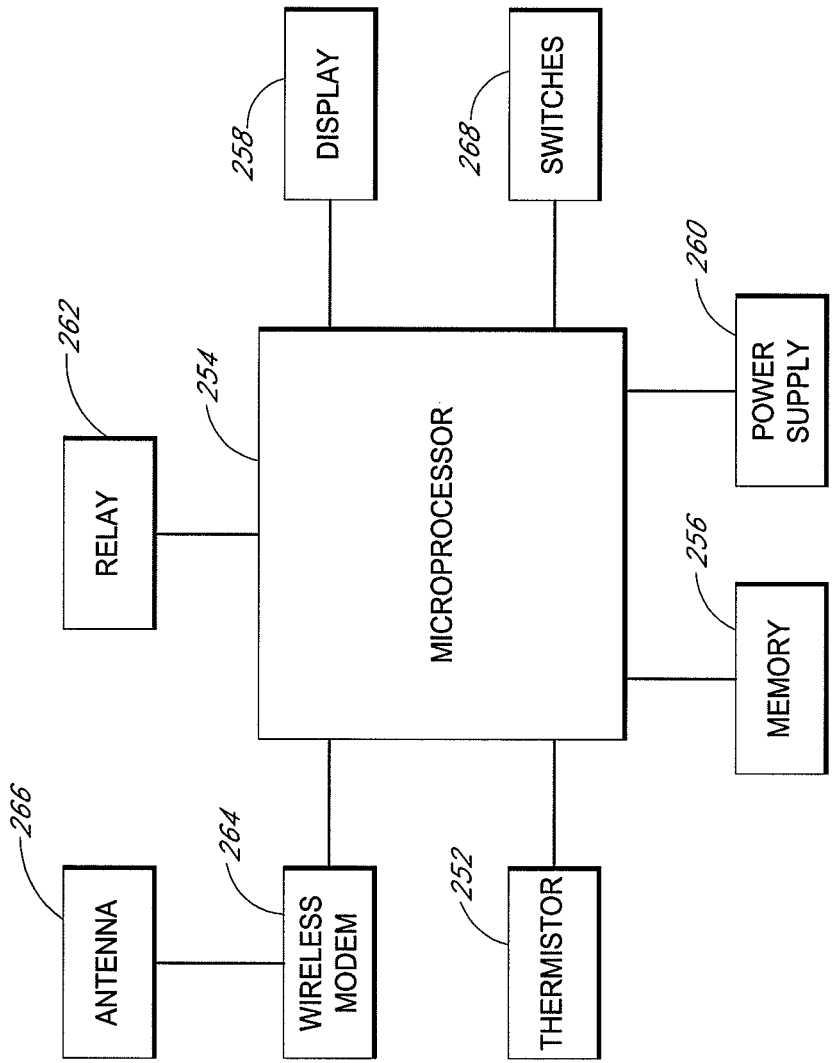
FIG. 4 shows a high-level schematic of the thermostat used as part of the subject invention.

FIG. 4 shows a high-level block diagram of thermostat 108 used as part of the subject invention. Thermostat 108 includes temperature sensing means 252, which may be a thermistor, thermal diode or other means commonly used in the design of electronic thermostats. It includes a microprocessor 254, memory 256, a display 258, a power source 260, at least one relay 262, which turns the HVAC system on and off in response to a signal from the microprocessor, and contacts by which the relay is connected to the wires that lead to the HVAC system. To allow the thermostat to communicate bi-directionally with the computer network, the thermostat also includes means 264 to connect the thermostat to a local computer or to a wired or wireless network. Such means could be in the form of Ethernet, wireless protocols such as IEEE 802.11, IEEE 802.15.4, Bluetooth, or other wireless protocols. The thermostat may be connected to the computer network directly via wired or wireless Internet Protocol connection. Alternatively, the thermostat may connect wirelessly to a gateway such as an IP-to-Zigbee gateway, an IP-to-Z-wave gateway, or the like. Where the communications means enabled include wireless communication, antenna 266 will also be included. The thermostat 108 may also include controls 268 allowing users to change settings directly at the thermostat, but such controls are not necessary to allow the thermostat to function.

Figure 5:
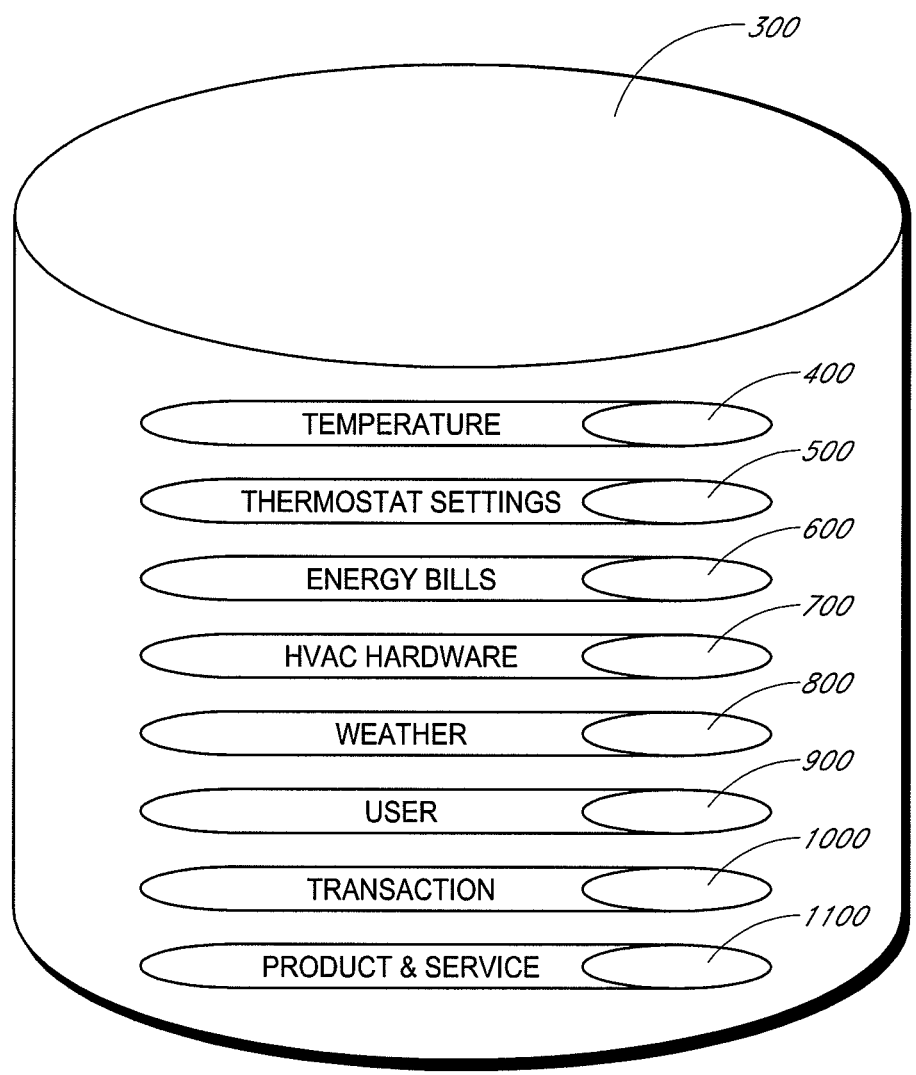
FIG. 5 shows one embodiment of the database structure used as part of the subject invention.

The data used to generate the content delivered in the form of the website and to automate control of thermostat 108 is stored on one or more servers 106 within one or more databases. As shown in FIG. 5, the overall database structure 300 may include temperature database 400, thermostat settings database 500, energy bill database 600, HVAC hardware database 700, weather database 800, user database 900, transaction database 1000, product and service database 1100 and such other databases as may be needed to support these and additional features.

The website will allow users of connected thermostats 108 to create personal accounts. Each user's account will store information in database 900, which tracks various attributes relative to users. Such attributes may include the make and model of the specific HVAC equipment in the user's home; the age and square footage of the home, the solar orientation of the home, the location of the thermostat in the home, the user's preferred temperature settings, etc.

As shown in FIG. 3, the website 200 will permit thermostat users to perform through the web browser substantially all of the programming functions traditionally performed directly at the physical thermostat, such as temperature set points, the time at which the thermostat should be at each set point, etc. Preferably the website will also allow users to accomplish more advanced tasks such as allow users to program in vacation settings for times when the HVAC system may be turned off or run at more economical settings, and to set macros that will allow changing the settings of the temperature for all periods with a single gesture such as a mouse click.

In addition to using the system to allow better signaling and control of the HVAC system, which relies primarily on communication running from the server to the thermostat, the bi-directional communication will also allow the thermostat 108 to regularly measure and send to the server information about the temperature in the building. By comparing outside temperature, inside temperature, thermostat settings, cycling behavior of the HVAC system, and other variables, the system will be capable of numerous diagnostic and controlling functions beyond those of a standard thermostat.

Figure 6A:
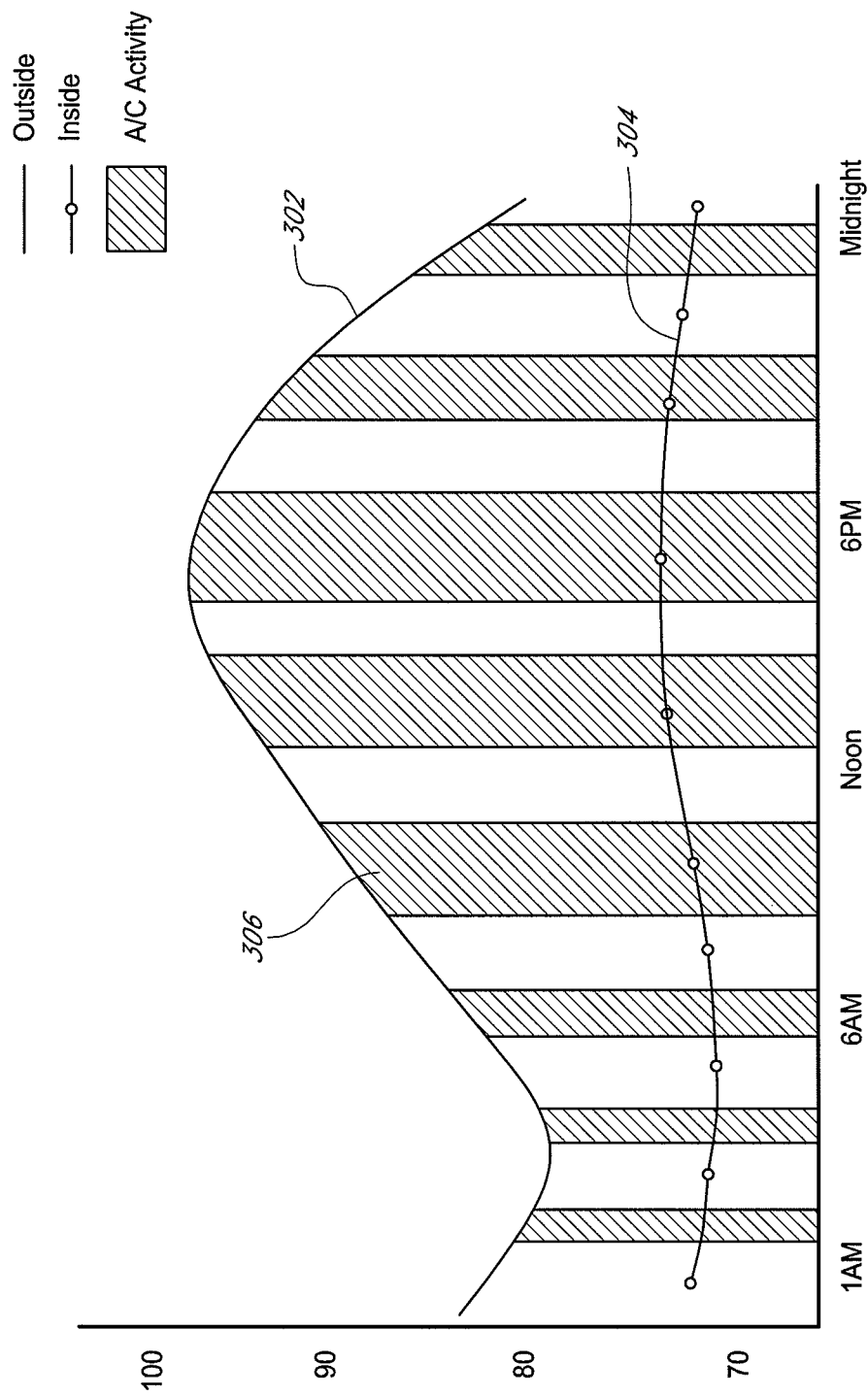
FIG. 6 shows how comparing inside temperature against outside temperature and other variables permits calculation of dynamic signatures.

For example, FIG. 6a shows a graph of inside temperature, outside temperature and HVAC activity for a 24 hour period. When outside temperature 302 increases, inside temperature 304 follows, but with some delay because of the thermal mass of the building, unless the air conditioning 306 operates to counteract this effect. When the air conditioning turns on, the inside temperature stays constant (or rises at a much lower rate or even falls) despite the rising outside temperature. In this example, frequent and heavy use of the air conditioning results in only a very slight temperature increase inside the house of 4 degrees, from 72 to 76 degrees, despite the increase in outside temperature from 80 to 100 degrees.

Figure 6B:
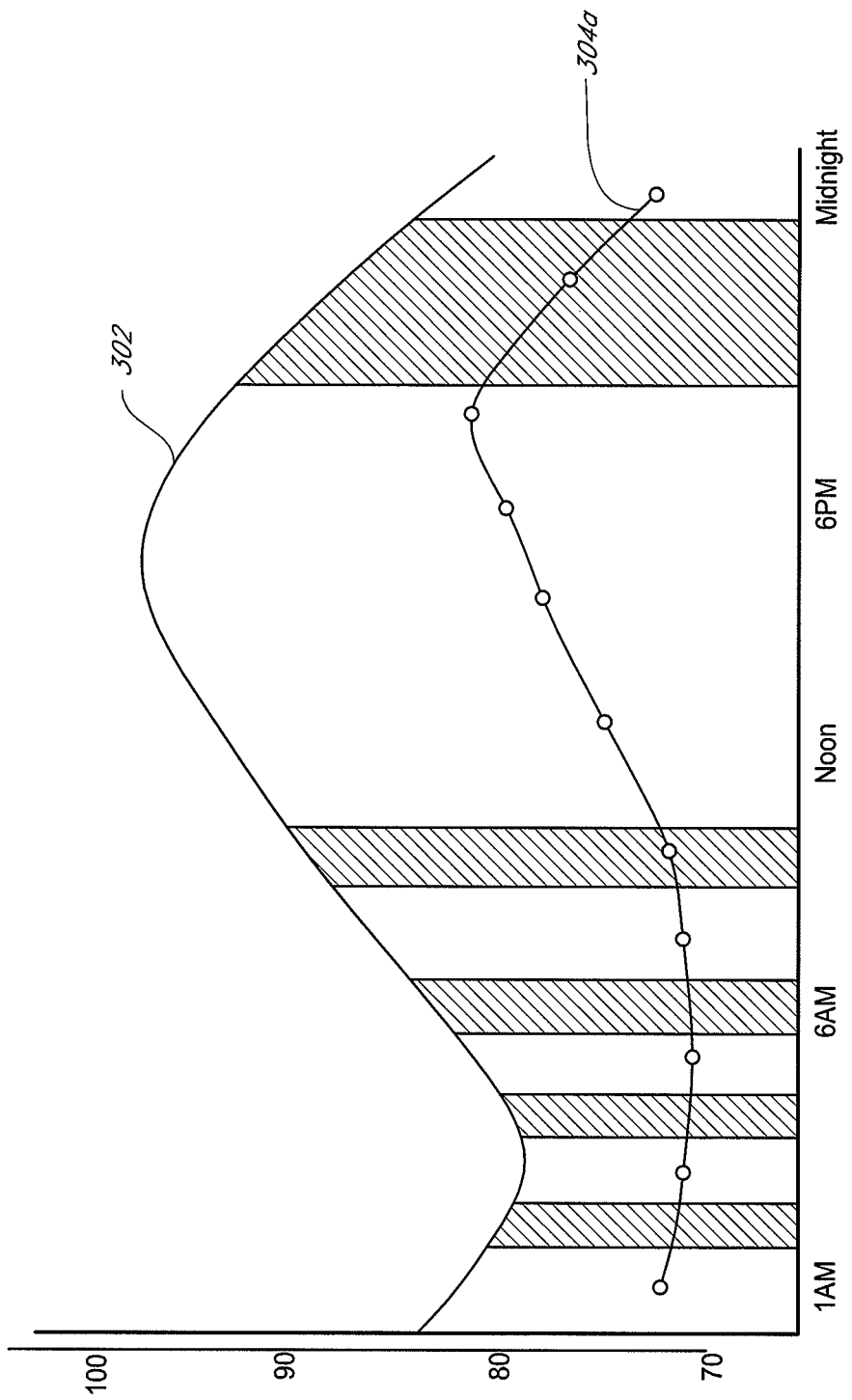

FIG. 6b shows a graph of the same house on the same day, but assumes that the air conditioning is turned off from noon to 7 PM. As expected, the inside temperature 304a rises with increasing outside temperatures 302 for most of that period, reaching 88 degrees at 7 PM. Because server 106 logs the temperature readings from inside each house (whether once per minute or over some other interval), as well as the timing and duration of air conditioning cycles, database 300 will contain a history of the thermal performance of each house. That performance data will allow the server 106 to calculate an effective thermal mass for each such structure—that is, the speed with the temperature inside a given building will change in response to changes in outside temperature. Because the server will also log these inputs against other inputs including time of day, humidity, etc. the server will be able to predict, at any given time on any given day, the rate at which inside temperature should change for given inside and outside temperatures.

The ability to predict the rate of change in inside temperature in a given house under varying conditions may be applied by in effect holding the desired future inside temperature as a constraint and using the ability to predict the rate of change to determine when the HVAC system must be turned on in order to reach the desired temperature at the desired time.

Figure 7:
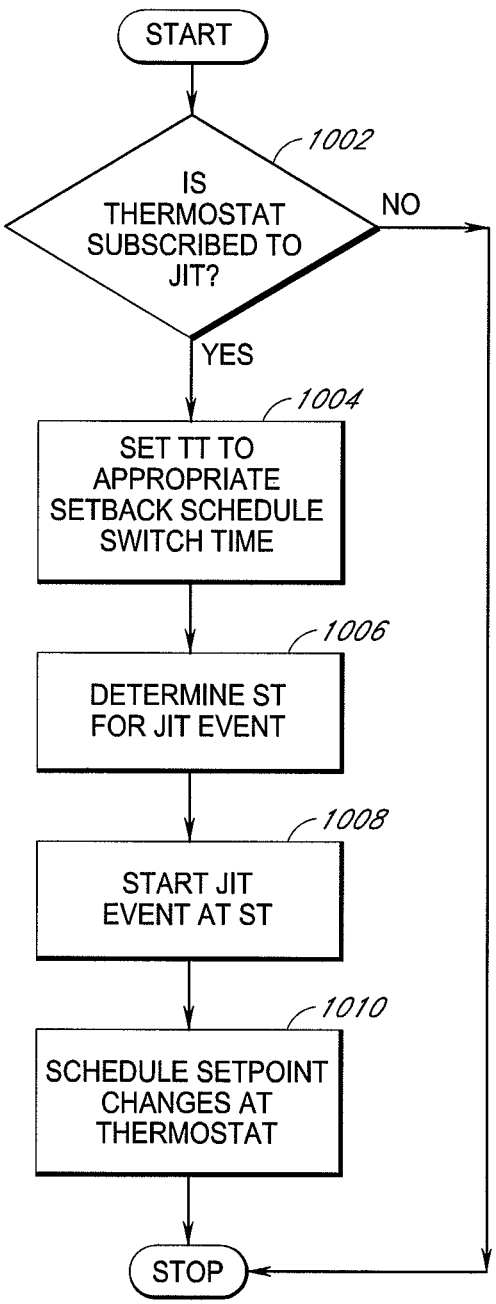
FIG. 7 shows a flow chart for a high level version of the process of calculating the appropriate turn-on time in a given home.

FIG. 7 shows a flowchart illustrating the high-level process for controlling a just-in-time (JIT) event. In step 1002, the server determines whether a specific thermostat 108 is scheduled to run the preconditioning program. If, not, the program terminates. If it so scheduled, then in step 1004 the server retrieves the predetermined target time when the preconditioning is intended to have been completed (TT). Using TT as an input, in step 1006 the server then determines the time at which the computational steps required to program the pre-conditioning event will be performed (ST). In step 1008, performed at start time ST, the server begins the process of actually calculating the required parameters, as discussed in greater detail below. Then in 1010 specific setpoint changes are transmitted to the thermostat so that the temperature inside the home may be appropriately changed as intended.

Figure 8:
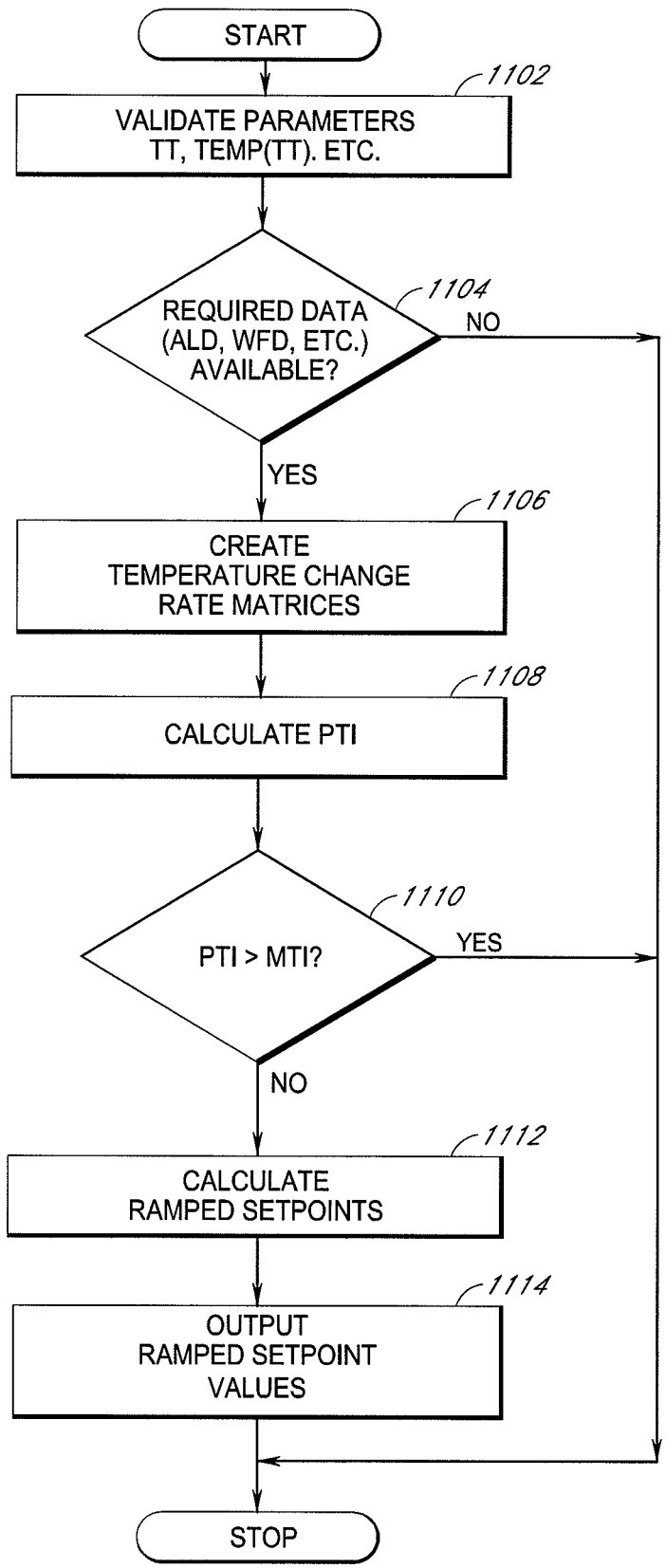
FIG. 8 shows a more detailed flowchart listing the steps in the process of calculating the appropriate turn-on time in a given home.
Figure 9A:
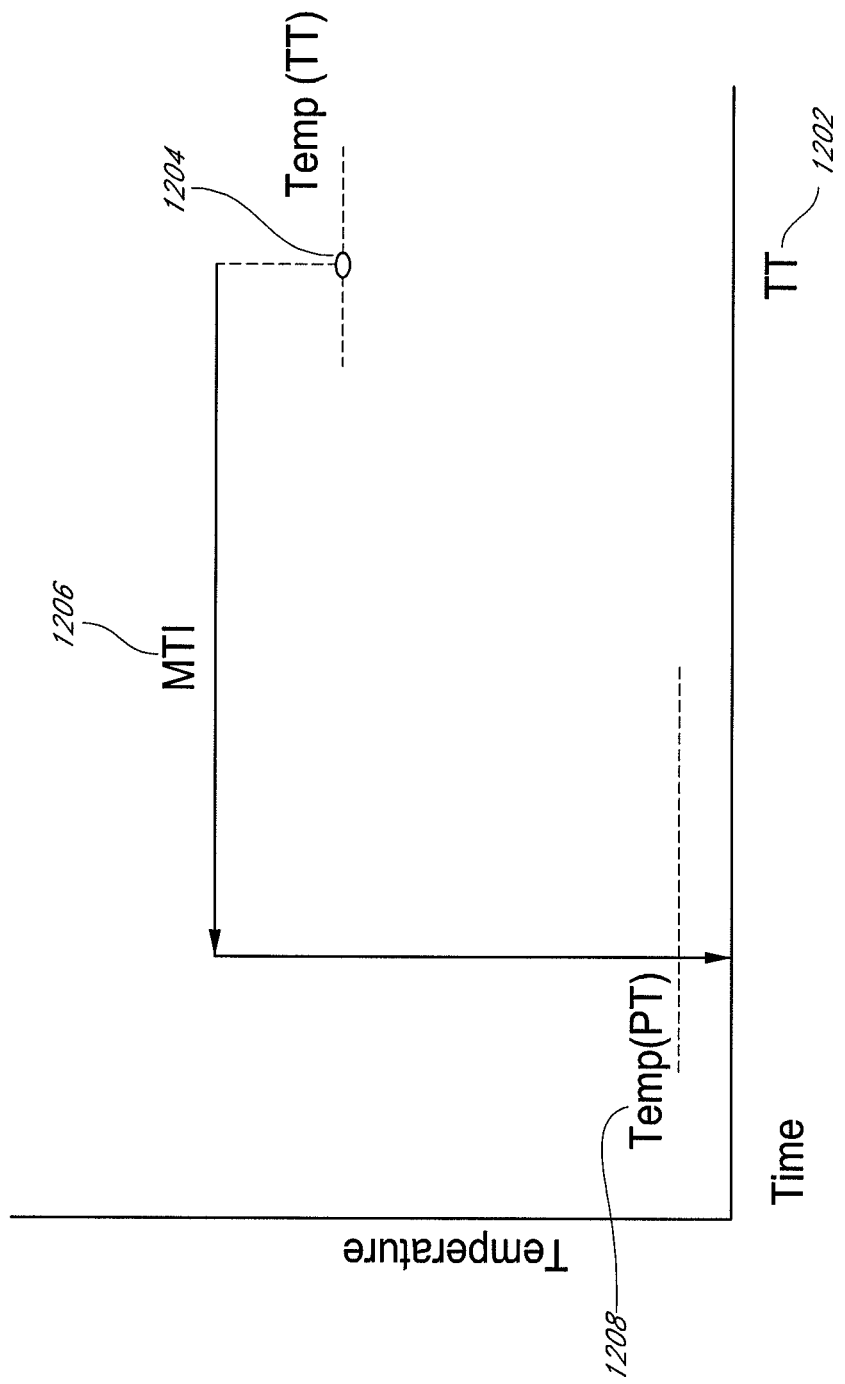
FIG. 9 shows the steps shown in the flowchart in FIG. 8 in the form of a graph of temperature and time.
Figure 9B:
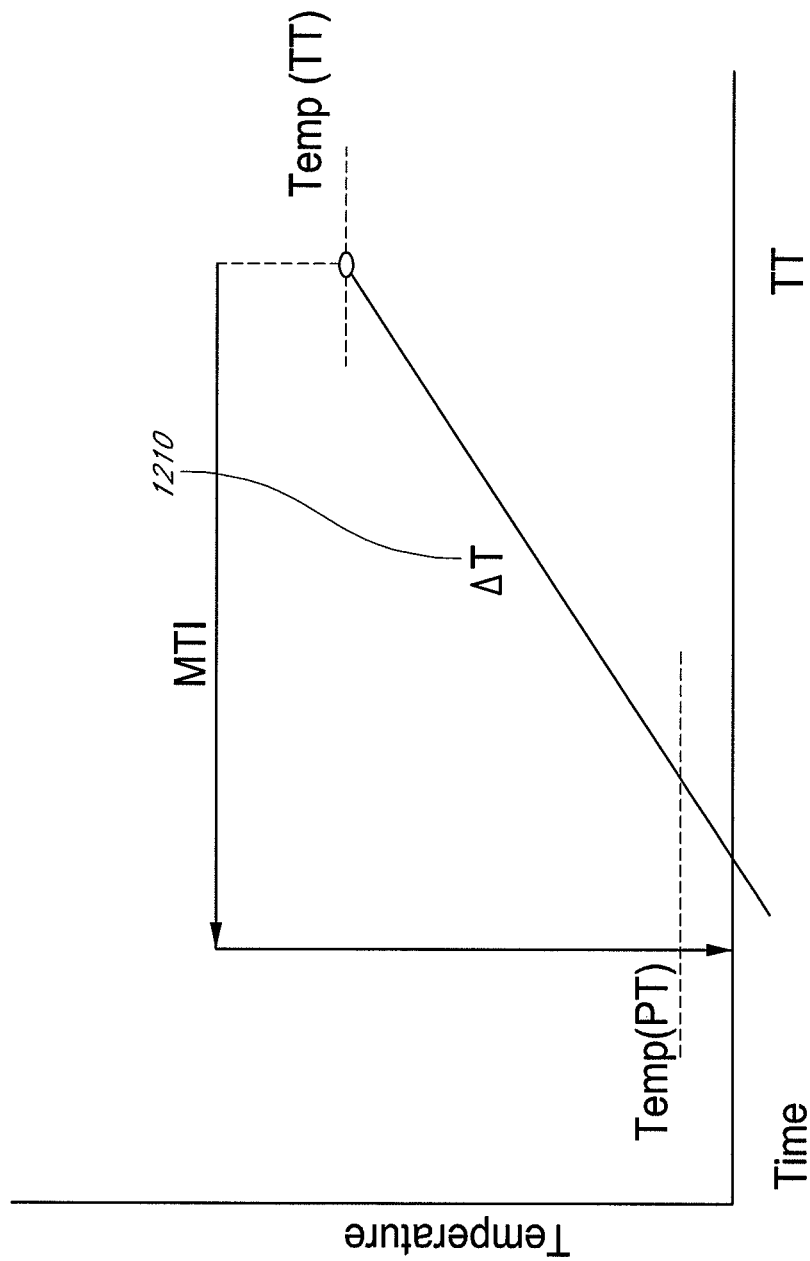
Figure 9C:
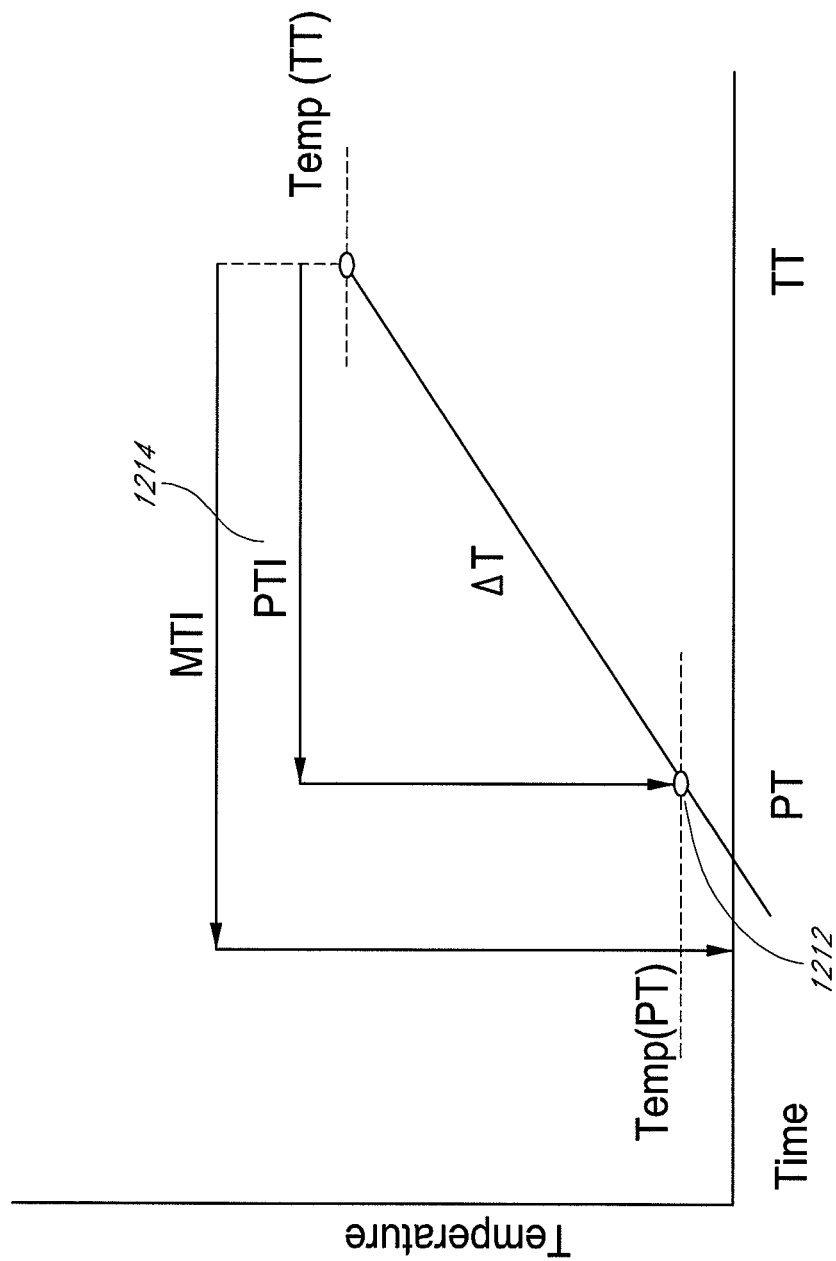
Figure 9D:
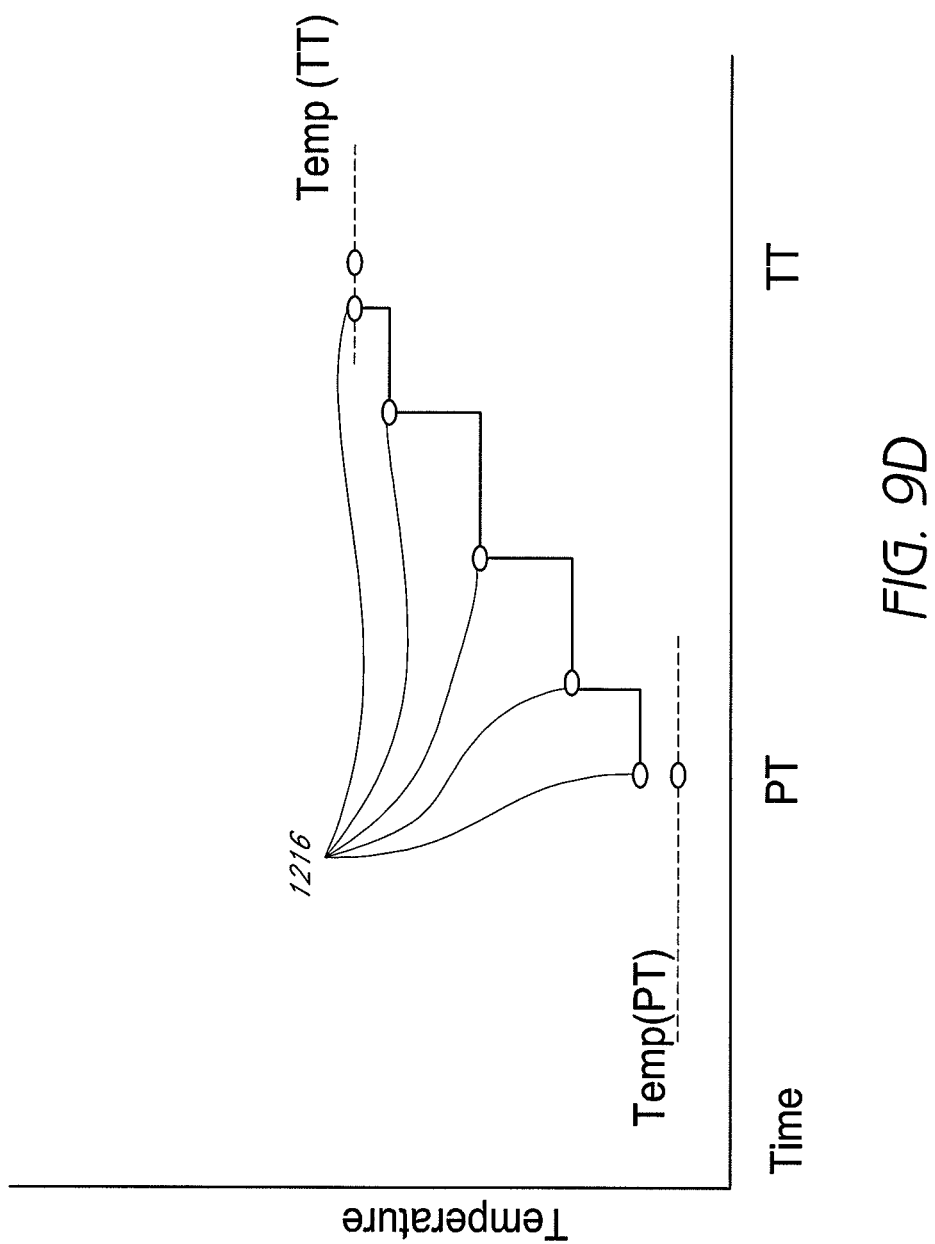

FIG. 8 shows a more detailed flowchart of the process. In step 1102, the server retrieves input parameters used to create a JIT event. These parameters include the maximum time allowed for a JIT event for thermostat 108 (MTI); the target time the system is intended to hit the desired temperature (TT); and the desired inside temperature at TT (TempTT). It is useful to set a value for MTI because, for example, it will be reasonable to prevent the HVAC system from running a preconditioning event if it would be expected to take 8 hours, which might be prohibitively expensive.

In step 1104, the server retrieves data used to calculate the appropriate start time with the given input parameters. This data includes a set of algorithmic learning data (ALD), composed of historic readings from the thermostat, together with associated weather data, such as outside temperature, solar radiation, humidity, wind speed and direction, etc; together with weather forecast data for the subject location for the period when the algorithm is scheduled to run (the weather forecast data, or WFD). The forecasting data can be as simple as a listing of expected temperatures for a period of hours subsequent to the time at which the calculations are performed, to more detailed tables including humidity, solar radiation, wind, etc. Alternatively, it can include additional information such as some or all of the kinds of data collected in the ALD.

In step 1106, the server uses the ALD and the WFD to create prediction tables that determine the expected rate of change or slope of inside temperature for each minute of HVAC cycle time ($\Delta T$) for the relevant range of possible pre-existing inside temperatures and outside climatic conditions. An example of a simple prediction table is illustrated in FIG. 13.

In step 1108, the server uses the prediction tables created in step 1106, combined with input parameters TT and Temp (TT) to determine the time at which slope $\Delta T$ intersects with predicted initial temperature PT. The time between PT and TT is the key calculated parameter: the preconditioning time interval, or PTI.

In step 1110, the server checks to confirm that the time required to execute the pre-conditioning event PTI does not exceed the maximum parameter MTI. If PTI exceeds MTI, the scheduling routine concludes and no ramping setpoints are transmitted to the thermostat.

If the system is perfect in its predictive abilities and its assumptions about the temperature inside the home are completely accurate, then in theory the thermostat can simply be reprogrammed once—at time PT, the thermostat can simply be reprogrammed to Temp(TT). However, there are drawbacks to this approach. First, if the server has been overly conservative in its predictions as to the possible rate of change in temperature caused by the HVAC system, the inside temperature will reach TT too soon, thus wasting energy and at least partially defeating the purpose of running the preconditioning routine in the first place. If the server is too optimistic in its projections, there will be no way to catch up, and the home will not reach Temp(TT) until after TT. Thus it would be desirable to build into the system a means for self-correcting for slightly conservative start times without excessive energy use. Second, the use of setpoints as a proxy for actual inside temperatures in the calculations is efficient, but can be inaccurate under certain circumstances. In the winter (heating) context, for example, if the actual inside temperature is a few degrees above the setpoint (which can happen when outside temperatures are warm enough that the home's natural "set point" is above the thermostat setting), then setting the thermostat to Temp(TT) at time PT will almost certainly lead to reaching TT too soon as well.

The currently preferred solution to both of these possible inaccuracies is to calculate and program a series of intermediate settings between Temp(PT) and Temp(TT) that are roughly related to $\Delta T$.

Thus if MTI is greater than PTI, then in step 1112 the server calculates the schedule of intermediate setpoints and time intervals to be transmitted to the thermostat. Because thermostats cannot generally be programmed with steps of less than 1 degree F., $\Delta T$ is quantized into discrete interval data of at least 1 degree F. each. For example, if Temp(PT) is 65 degrees F., Temp(TT) is 72 degrees F., and PT is 90 minutes, the thermostat might be programmed to be set at 66 for 10 minutes, 67 for 12 minutes, 68 for 15 minutes, etc. The server may optionally limit the process by assigning a minimum programming interval (e.g., at least ten minutes between setpoint changes) to avoid frequent switching of the HVAC system, which can reduce accuracy because of the thermostat's compressor delay circuit, which may prevent quick corrections. The duration of each individual step may be a simple arithmetic function of the time PTI divided by the number of whole-degree steps to be taken; alternatively, the duration of each step may take into account second order thermodynamic effects relating to the increasing difficulty of "pushing" the temperature inside a house further from its natural setpoint given outside weather conditions, etc. (that is, the fact that on a cold winter day it may take more energy to move the temperature inside the home from 70 degrees F. to 71 than it does to move it from 60 degrees to 61).

In step 1114, the server schedules setpoint changes calculated in step 1112 for execution by the thermostat.

Figure 11:
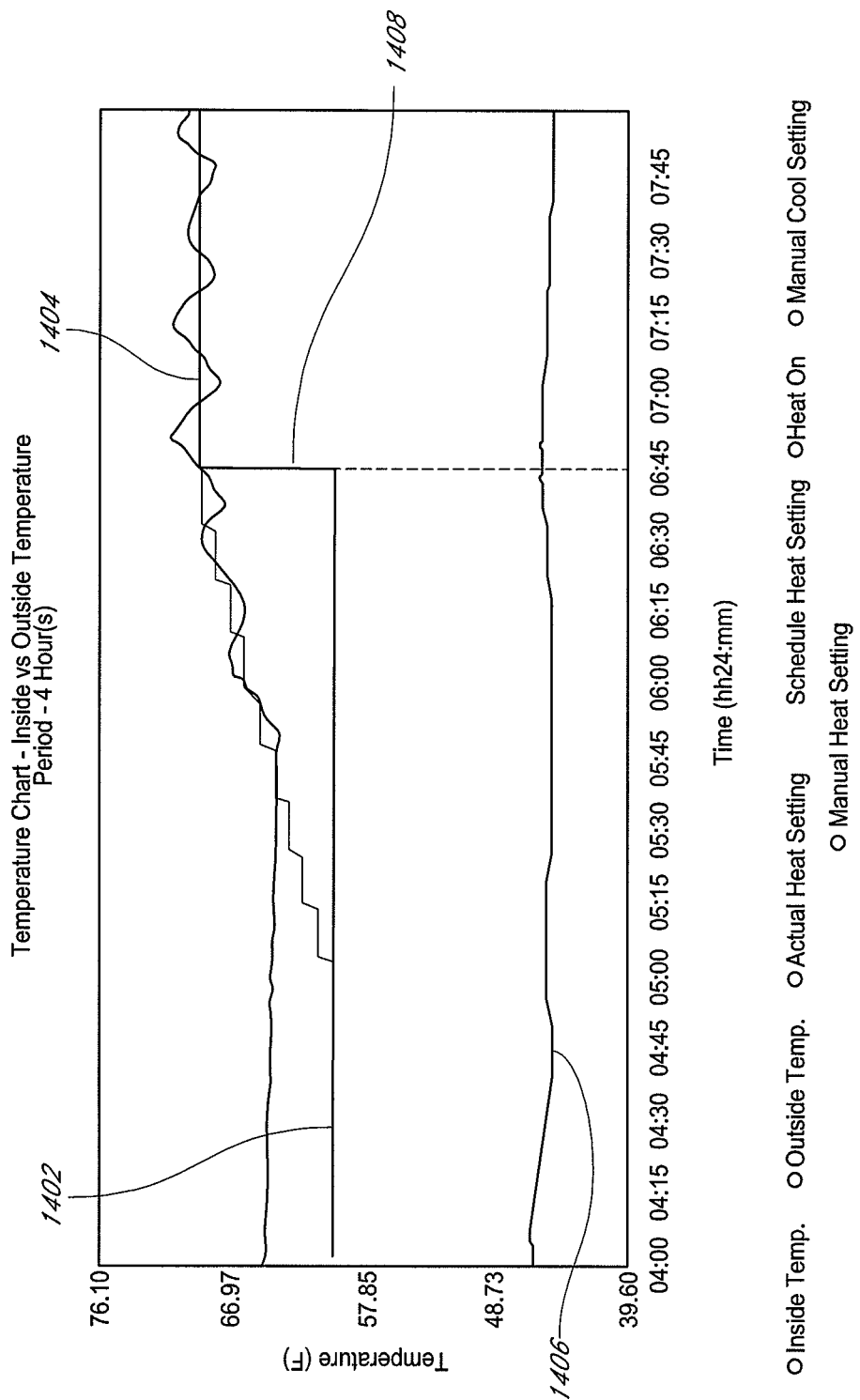
FIG. 11 shows the subject invention as applied in a specific home on a specific day.
Figure 12:
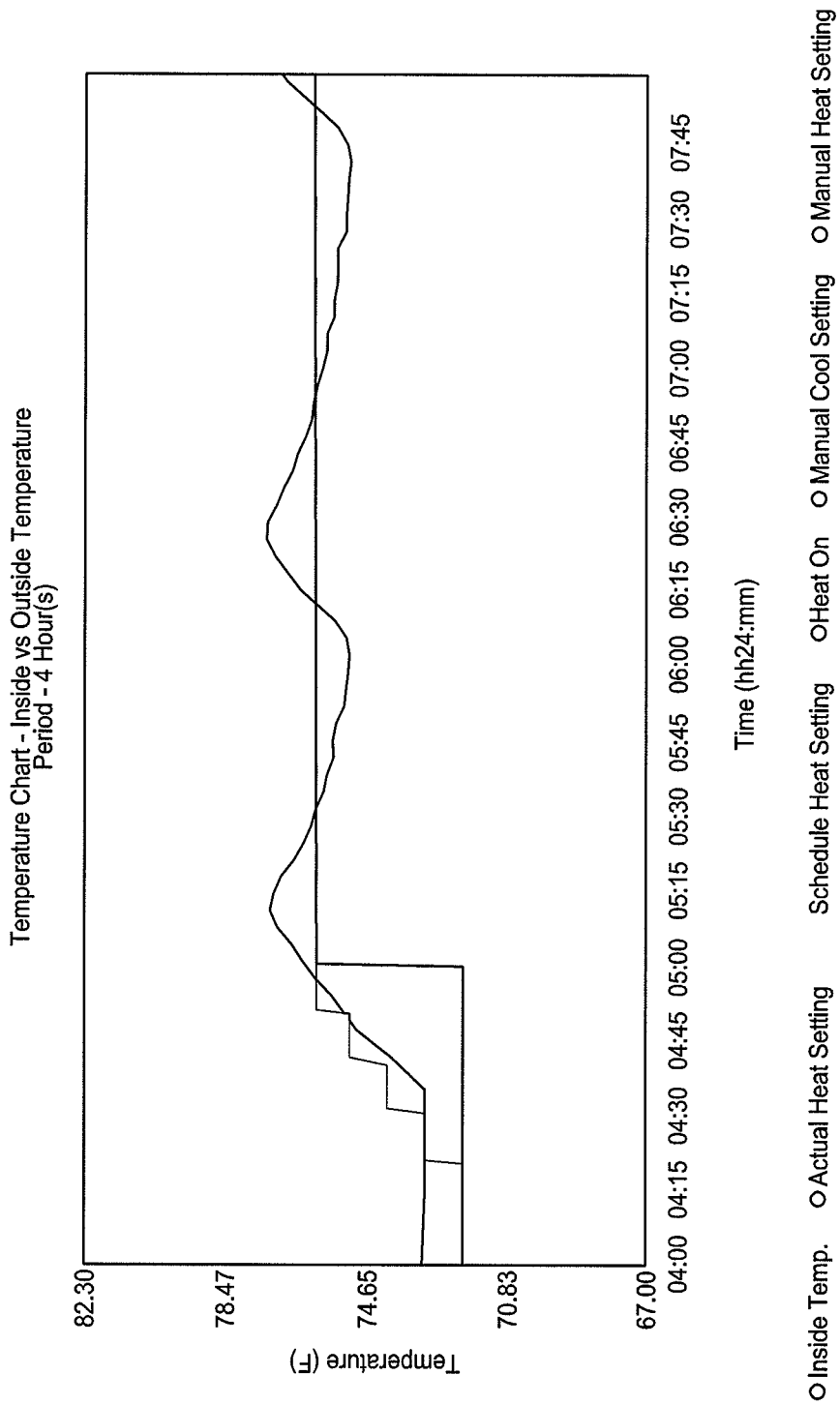
FIG. 12 shows the subject invention as applied in a different specific home on a specific day.

With this system, if actual inside temperature at PT is significantly higher than Temp(PT), then the first changes to setpoints will have no effect (that is, the HVAC system will remain off), and the HVAC system will not begin using energy, until the appropriate time, as shown in FIG. 12. Similarly, if the server has used conservative predictions to generate ΔT, and the HVAC system runs ahead of the predicted rate of change, the incremental changes in setpoint will delay further increases until the appropriate time in order to again minimize unnecessary energy use, as shown in FIG. 11.

FIG. 9(*a*) through 9(*d*) shows the steps in the pre-conditioning process as a graph of temperature and time. FIG. 9(*a*) shows step 1102, in which inputs target time TT 1202, target temperature Temp(TT) 1204, maximum conditioning interval MTI 1206 and the predicted inside temperature during the period of time the preconditioning event is likely to begin Temp(TT) 1204 are retrieved.

FIG. 9(*b*) shows the initial calculations performed in step 1108, in which expected rate of change in temperature ΔT 1210 inside the home is generated from the ALD and WFD using Temp(TT) 1204 at time TT 1202 as the endpoint.

FIG. 9(*c*) shows how in step 1108 ΔT 1210 is used to determine start time PT 1212 and preconditioning time interval PTI 1214. It also shows how in step 1110 the server can compare PTI with MTI to determine whether or not to instantiate the pre-conditioning program for the thermostat.

FIG. 9(*d*) shows step 1112, in which specific ramped setpoints 1216 are generated. Because of the assumed thermal mass of the system, actual inside temperature at any given time will not correspond to setpoints until some interval after each setpoint change. Thus initial ramped setpoint 1216 may be higher than Temp(PT) 1208, for example.

FIG. 10 shows an example of the types of data that may be used by the server in order to calculate ΔT 1210. Such data may include inside temperature 1302, outside temperature 1304, cloud cover 1306, humidity 1308, barometric pressure 1310, wind speed 1312, and wind direction 1314.

Each of these data points should be captured at frequent intervals. In the preferred embodiment, as shown in FIG. 10, the interval is once every 60 seconds.

FIG. 11 shows application of the subject invention in an actual house. Temperature and setpoints are plotted for the 4-hour period from 4 AM to 8 AM with temperature on the vertical axis and time on the horizontal axis. The winter nighttime setpoint 1402 is 60 degrees F.; the morning setpoint temperature 1404 is 69 degrees F. The outside temperature 1406 is approximately 45 degrees F. The target time TT 1408 for the setpoint change to morning setting is 6:45 AM. In the absence of the subject invention, the homeowner could program the thermostat to change to the new setpoint at 6:45, but there is an inherent delay between a setpoint change and the response of the temperature inside the home. (In this home on this day, the delay is approximately fifty minutes.) Thus if the homeowner truly desired to achieve the target temperature at the target time, some anticipation would be necessary. The amount of anticipation required depends upon numerous variables, as discussed above.

After calculating the appropriate slope ΔT 1210 by which to ramp inside temperature in order to reach the target as explained above, the server transmits a series of setpoints 1216 to the thermostat because the thermostat is presumed to only accept discrete integers as program settings. (If a thermostat is capable of accepting finer settings, as in the case of some thermostats designed to operate in regions in which temperature is generally denoted in Centigrade rather than Fahrenheit, which accept settings in half-degree increments, tighter control may be possible.) In any event, in the currently preferred embodiment of the subject invention, programming changes are quantized such that the frequency of setpoint changes is balanced between the goal of minimizing network traffic and the frequency of changes made on the one hand and the desire for accuracy on the other. Balancing these considerations may result in some cases in either more frequent changes or in larger steps between settings. As shown in FIG. 11, the setpoint "stairsteps" from 60 degrees F. to 69 degrees F. in nine separate setpoint changes over a period of 90 minutes.

Because the inside temperature when the setpoint management routine was instantiated at 5:04 AM was above the "slope" and thus above the setpoint, the HVAC system was not triggered and no energy was used unnecessarily heating the home before such energy use was required. Actual energy usage does not begin until 5:49 AM.

FIG. 12 shows application of the subject invention in a different house during a similar four hour interval. In FIG. 12, the predicted slope ΔT 1210 is less conservative relative to the actual performance of the home and HVAC system, so there is no off cycling during the preconditioning event—the HVAC system turns on at approximately 4:35 AM and stays on continuously during the event. The home reaches the target temperature Temp(TT) roughly two minutes prior to target time TT.

FIG. 13 shows a simple prediction table. The first column 1602 lists a series of differentials between outside and inside temperatures. Thus when the outside temperature is 14 degrees and the inside temperature is 68 degrees, the differential is −54 degrees; when the outside temperature is 94 degrees and the inside temperature is 71 degrees, the differential is 13 degrees. The second column 1604 lists the predicted rate of change in inside temperature ΔT 1210 assuming that the furnace is running in terms of degrees Fahrenheit of change per hour. A similar prediction table will be generated for predicted rates of change when the air conditioner is on; additional tables may be generated that predict how temperatures will change when the HVAC system is off.

Alternatively, the programming of the just-in-time setpoints may be based not on a single rate of change for the entire event, but on a more complex multivariate equation that takes into account the possibility that the rate of change may be different for events of different durations.

The method for calculating start times may also optionally take into account not only the predicted temperature at the calculated start time, but may incorporate measured inside temperature data from immediately prior to the scheduled start time in order to update calculations, or may employ more predictive means to extrapolate what inside temperature based upon outside temperatures, etc.

Additional means of implementing the instant invention may be achieved using variations in system architecture. For example, much or even all of the work being accomplished by remote server 106 may also be done by thermostat 108 if that device has sufficient processing capabilities, memory, etc. Alternatively, these steps may be undertaken by a local processor such as a local personal computer, or by a dedicated appliance having the requisite capabilities, such as gateway 112.

What is claimed is:

1. A method for reducing the cycling time of a climate control system, said method comprising:

accessing stored data comprising a plurality of historic internal temperature readings taken within a structure and a plurality of measurements relating to a plurality of historic external temperatures outside said structure during at least one selected time period;

determining one or more thermal performance values of said structure by correlating at least one of the plurality of historic internal temperatures with at least one of the plurality of historic external temperatures that both occur at a first time during the at least one selected time period, and by correlating at least one of the plurality of historic internal temperatures with at least one of the plurality of historic external temperatures that both occur at a second time during the at least one selected time period, wherein said one or more thermal performance values indicate a rate of change of temperature in said structure in response to changes in outside temperatures;

storing said one or more thermal performance values of said structure;

retrieving a target time at which said structure is desired to reach a target temperature;

acquiring at least a first internal temperature inside said structure at a third time prior to said target time;

acquiring at least a first external temperature relating to a temperature outside said structure at the third time prior to said target time;

obtaining at least one forecasted temperature forecasted to occur outside the structure at the target time;

retrieving at least said one or more thermal performance values of said structure that indicate said rate of change of temperature in said structure in response to changes in outside temperatures;

retrieving at least one performance characteristic of said climate control system;

determining a first time prior to said target time at which said climate control system should turn on to reach the target temperature by the target time based at least in part on said one or more thermal performance values of said structure, said performance characteristic of said climate control system, said first internal temperature, said first external temperature, and the forecasted temperature;

calculating a plurality of intermediate setpoints and a plurality of setpoint target times that occur between the first time and the target time based at least in part on said one or more thermal performance values of said structure, said performance characteristic of said climate control system, said first internal temperature, said first external temperature, and the forecasted temperature, wherein the plurality of intermediate setpoints direct a thermostatic controller to change the actual temperature inside the structure to the target temperature in a series of intermediate steps;

transmitting the plurality of intermediate setpoints to the thermostatic controller; and setting the thermostatic controller with the plurality of intermediate setpoints to control said climate control system.

2. A method as in claim 1 where said thermostatic controller operates a system for changing the air temperature in a structure.

3. A method as in claim 1 where said climate control system is a heating, ventilation and air conditioning system.

4. A method as in claim 1 where said climate control system is a heating, ventilation and air conditioning system in a single family residence.

5. A method as in claim 1 in which at least one remote processor is in communication with said thermostatic controller.

6. A method as in claim 5 in which said remote processor is not located in the same structure as said thermostatic controller.

7. A method as in claim 5 in which said remote processor sets programming for said thermostatic controller.

8. A method as in claim 1 in which said thermostatic controller is programmable.

9. A method for minimizing the cycling time of a space heating system, said method comprising:

accessing stored data comprising a plurality of historic internal temperatures within a structure and a plurality of historic external temperatures outside said structure, during at least one selected time period;

determining one or more thermal performance values of said structure by correlating at least one of the plurality of historic internal temperatures with at least one of the plurality of historic external temperatures that both occur at a first time during the at least one selected time period, and by correlating at least one of the plurality of historic internal temperatures with at least one of the plurality historic external temperatures that both occur at a second time during the at least one selected time period, wherein said one or more thermal performance values indicate a rate of change of temperature in said structure in response to changes in outside temperatures;

storing the one or more thermal performance values of said structure;

retrieving a target time at which a temperature in said structure is desired to reach a target temperature;

acquiring a first internal temperature inside said structure at a third time prior to said target time;

acquiring a first external temperature outside said structure at a-the third time prior to said target time;

obtaining at least one forecasted temperature forecasted to occur outside said structure at the target time;

retrieving at least said one or more thermal performance values of said structure that indicate said rate of change of temperature in said structure in response to changes in outside temperatures;

retrieving at least one performance characteristic of a climate control system;

calculating at least a first setpoint and a second setpoint that occur between the first time and the target time, wherein the first and second setpoints direct a thermostatic controller to change the actual temperature inside the structure to the target temperature in a series of intermediate steps based at least in part on said one or more thermal performance values of said structure, said at least one performance characteristic of the climate control system, said first internal temperature and said first external temperature, and the forecasted temperature, where said second setpoint is lower than said target temperature, and said first setpoint is lower than said second setpoint;

calculating at least a first setpoint target time and a second setpoint target time based at least in part on said one or more thermal performance values of said structure, said at least one performance characteristic of the climate control system, said first internal temperature and said first external temperature, and the forecasted temperature, where said second setpoint target time is prior to said target time, and said first setpoint target time is prior to said second setpoint target time;

transmitting at least the first and second setpoints to the thermostatic controller; and setting at least said first setpoint at said first setpoint target time and said second setpoint at said second setpoint target time on a thermostatic controller used to control said climate control system.

10. A method as in claim 9 where said climate control system is a heating, ventilation and air conditioning system in a single family residence.

11. A method as in claim 9 in which at least one remote processor is in communication with said thermostatic controller.

12. A method as in claim 11 in which said remote processor is not located in the same structure as said thermostatic controller.

13. A method as in claim 11 in which said remote processor sets programming for said thermostatic controller.

14. A method as in claim 9 in which said thermostatic controller is programmable.

15. A method for minimizing the cycling time of an air conditioning system, said method comprising:

accessing stored data comprising a plurality of historic internal temperatures readings taken within a structure and a plurality of measurements relating to a plurality of historic external temperatures outside said structure, during at least one selected time period;

determining one or more thermal performance values of said structure by correlating at least one of the plurality of historic internal temperatures with at least one of the plurality of historic external temperatures that both occur at a first time during the at least one selected time period, and by correlating at least one of the plurality of historic internal temperatures with at least one of the plurality of historic external temperatures that both occur at a second time during the at least one selected time period, wherein said one or more thermal performance values indicate a rate of change of temperature in said structure in response to changes in outside temperatures;

storing one or more thermal performance values of said structure;

retrieving a target time at which a temperature in said structure is desired to reach a target temperature;

acquiring at least a first internal temperature inside said structure at a third time prior to said target time;

acquiring at least a first external temperature outside said structure at the third time prior to said target time;

obtaining at least one forecasted temperature forecasted to occur outside the structure at the target time;

retrieving at least said one or more thermal performance values of said structure;

retrieving at least one performance characteristic of said air conditioning system;

calculating at least a first setpoint and a second setpoint that occur between the first time and the target time, wherein the first and second setpoints direct a thermostatic controller to change the actual temperature inside the structure to the target temperature in a series of intermediate steps based at least in part on said one or more thermal performance values of said structure, said at least one performance characteristic of the air conditioning system, said first internal temperature and said first external temperature, and the forecasted temperature, where said second setpoint is higher than said target temperature, and said first setpoint is higher than said second setpoint;

calculating at least a first setpoint target time and a second setpoint target time based at least in part on said one or more thermal performance values of said structure, said at least one performance characteristic of the air conditioning system, said first internal temperature and said first external temperature, and the forecasted temperature, where said second setpoint target time is prior to said target time, and said first setpoint target time is prior to said second setpoint target time;

transmitting the first setpoint and the second setpoint to the thermostatic controller; and setting at least said first setpoint at said first setpoint target time and said second setpoint at said second setpoint target time on a thermostatic controller used to control a climate control system.

16. A method as in claim 15 where said climate control system is a heating, ventilation and air conditioning system in a single family residence.

17. A method as in claim 15 in which at least one remote processor is in communication with said thermostatic controller.

18. A method as in claim 17 in which said remote processor is not located in the same structure as said thermostatic controller.

19. A method as in claim 17 in which said remote processor sets programming for said thermostatic controller.

20. A method as in claim 15 in which said thermostatic controller is programmable.

* * * * *

UNITED STATES PATENT AND TRADEMARK OFFICE
CERTIFICATE OF CORRECTION

PATENT NO.       : 8,498,753 B2
APPLICATION NO.  : 12/773690
DATED            : July 30, 2013
INVENTOR(S)      : John Douglas Steinberg et al.

Page 1 of 1

It is certified that error appears in the above-identified patent and that said Letters Patent is hereby corrected as shown below:

On the title page, item 57 in the abstract, line 4, please change "structureis" to -- structure is --.

In the Claims

In column 10, line 35, in Claim 9, please change "plurality" to -- plurality of --.

In column 10, line 47, in Claim 9, please change "a-the" to -- the --.

Signed and Sealed this
Seventh Day of October, 2014

Michelle K. Lee
*Deputy Director of the United States Patent and Trademark Office*